(12) United States Patent
Zanardi

(10) Patent No.: US 7,896,403 B2
(45) Date of Patent: Mar. 1, 2011

(54) PIPE/SILENCER DEVICE ASSEMBLY

(75) Inventor: Mariofelice Zanardi, Turin (IT)

(73) Assignee: Dayco Fluid Technologies S.p.A., Turin (IT)

(*) Notice: Subject to any disclaimer, the term of this patent is extended or adjusted under 35 U.S.C. 154(b) by 323 days.

(21) Appl. No.: 11/884,714

(22) PCT Filed: Feb. 21, 2005

(86) PCT No.: PCT/IT2005/000094
§ 371 (c)(1),
(2), (4) Date: Jun. 25, 2008

(87) PCT Pub. No.: WO2006/087745
PCT Pub. Date: Aug. 24, 2006

(65) Prior Publication Data
US 2008/0271946 A1 Nov. 6, 2008

(51) Int. Cl.
F16L 55/04 (2006.01)
(52) U.S. Cl. .......... 285/133.11; 285/49; 181/233; 180/441; 138/30
(58) Field of Classification Search ......... 285/133.11, 285/133.3, 133.4, 256, 900, 901, 49; 138/26; 180/441, 442; 181/233; 138/30
See application file for complete search history.

(56) References Cited

U.S. PATENT DOCUMENTS

| | | | | |
|---|---|---|---|---|
| 1,799,968 A * | 4/1931 | Gillen | ............ | 138/26 |
| 2,030,943 A * | 2/1936 | Schrottke | ............ | 138/26 |
| 2,100,404 A * | 11/1937 | Mason et al. | ............ | 138/26 |
| 2,730,132 A | 4/1952 | Marcus et al. | | |
| 3,215,164 A * | 11/1965 | Szczepanski | ............ | 138/26 |
| 3,323,305 A * | 6/1967 | Klees | ............ | 138/26 |
| 3,660,979 A * | 5/1972 | Kamakura et al. | ............ | 138/26 |
| 3,818,931 A | 6/1974 | Carpenter | | |
| 3,831,983 A * | 8/1974 | Stickler | ............ | 285/133.4 |
| 4,203,287 A * | 5/1980 | Bennett | ............ | 60/329 |
| 4,562,036 A * | 12/1985 | Shin et al. | ............ | 138/30 |
| 4,671,380 A * | 6/1987 | Henderson et al. | ............ | 138/30 |
| 5,094,271 A * | 3/1992 | Fritz et al. | ............ | 138/26 |
| 5,475,976 A * | 12/1995 | Phillips | ............ | 60/327 |
| 5,495,711 A * | 3/1996 | Kalkman et al. | ............ | 138/26 |
| 5,539,164 A * | 7/1996 | van Ruiten | ............ | 138/30 |
| 5,727,390 A * | 3/1998 | Hartle | ............ | 60/453 |
| 5,941,283 A * | 8/1999 | Forte | ............ | 138/26 |

(Continued)

FOREIGN PATENT DOCUMENTS

DE  29623772  11/1999

(Continued)

OTHER PUBLICATIONS

Search Report and Written Opinion mailed Oct. 18, 2005 in PCT Appln. No. PCT/IT2005/000094.

*Primary Examiner* — David E Bochna
(74) *Attorney, Agent, or Firm* — Davidson Berquist Jackson & Gowdy, LLP

(57) ABSTRACT

A pipe/silencer device assembly comprising a connection element, which has a through hole, having an axis, and a branching off hole, which is fluidically connected to the through hole and wherein the assembly comprises: first connection co-operating with a first duct; a second duct, fluidically connected to the connection element; and a blind silencer duct, fluidically connected to the branching off hole.

13 Claims, 1 Drawing Sheet

U.S. PATENT DOCUMENTS

| | | | | |
|---|---|---|---|---|
| 5,983,946 A * | 11/1999 | Chen et al. | ............... | 138/30 |
| 6,234,758 B1 * | 5/2001 | Pawelski | ............... | 417/26 |
| 7,296,651 B2 * | 11/2007 | Dooley | ............... | 180/441 |
| 7,373,824 B2 * | 5/2008 | Krieger et al. | ............... | 73/700 |
| 2006/0201734 A1 * | 9/2006 | Hartle | ............... | 180/417 |

FOREIGN PATENT DOCUMENTS

| | | |
|---|---|---|
| EP | 0430223 | 6/1991 |
| EP | 534042 A1 * | 3/1993 |
| EP | 0877310 | 11/1998 |
| EP | 1188981 | 3/2002 |
| EP | 1300622 | 4/2003 |

* cited by examiner

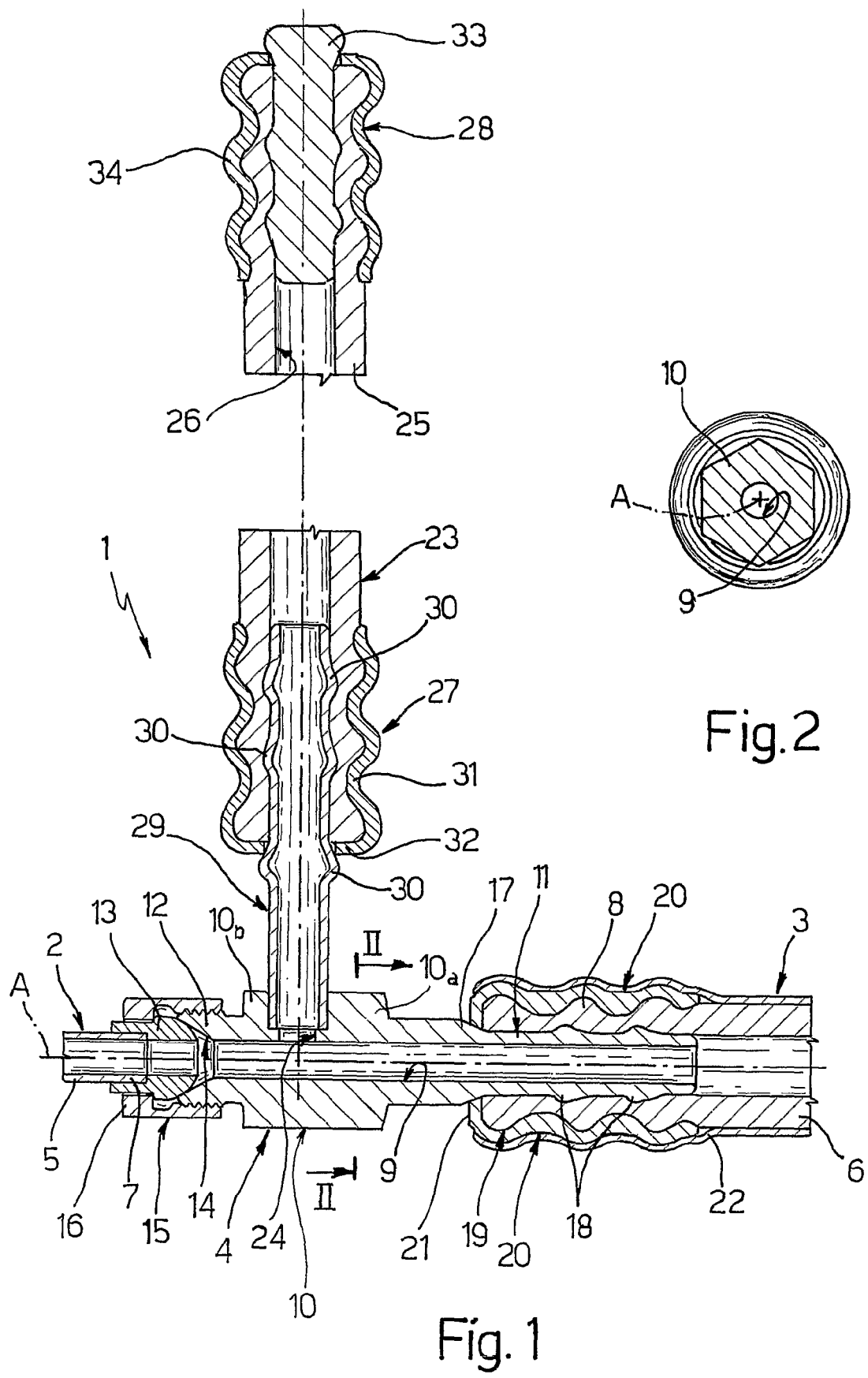

PIPE/SILENCER DEVICE ASSEMBLY

TECHNICAL FIELD

The present invention relates to a pipe/silencer device assembly and has a preferred but non-limiting application in a hydraulic power-steering system of a motor vehicle.

BACKGROUND ART

Hydraulic power-steering systems actuate the steering actuator via a working fluid at a high pressure and generally comprise: a first duct connected to a feed pump; a second duct connected to a steering actuator; and a connection element for joining the first and second duct fluidically.

The ducts of the hydraulic power-steering system are further provided with a silencer device, thus defining a pipe/silencer device assembly for the purpose of damping the pressure waves that cause noise, which is perceptible above all at low engine-running speeds and which propagate in the working fluid principally on account of the fluctuations in the flow rate during the steering transients.

Known silencer devices comprise damping pipes, which are arranged coaxially within the flexible duct and are designed to dampen the energy contained in the pressure waves.

Known coaxial pipe/silencer device assemblies present a relatively complicated structure, which entails a costly procedure of installation.

DISCLOSURE OF INVENTION

The purpose of the present invention is to provide a pipe/silencer device assembly which is free from the drawback referred to above.

The purpose of the present invention is achieved via a pipe/silencer device assembly as defined in claim 1.

BRIEF DESCRIPTION OF THE DRAWINGS

For a better understanding of the present invention, there is now described a preferred embodiment thereof, provided purely by way of non-limiting example, with reference to the attached drawing, in which:

FIG. 1 represents a partial longitudinal cross section of a pipe/silencer device assembly according to the present invention; and FIG. 2 is a cross-sectional view of the pipe/silencer device assembly according to the line II-II of FIG. 1.

BEST MODE FOR CARRYING OUT THE INVENTION

In FIG. 1, the reference number 1 designates a pipe/silencer device assembly comprising: a multilayer expandable flexible duct 3, which is adapted for being connected to a pump and comprises a layer made of elastomeric material; and a connection element 4, which has an elongated shape and is connected to the flexible duct 3 and can moreover be connected to a rigid duct 2 made of metal material connected to a steering actuator (not illustrated).

The rigid duct 2 and the flexible duct 3 comprise respective cylindrical side walls 5, 6 with respective axial end portions 7, 8 connected to the connection element 4.

The connection element 4 has: a through hole 9, which has an axis A and which is fluidically connected to the rigid duct 2 and to the flexible duct 3 and concentrically comprises, sharing the same axis A: a central body 10; a tubular end portion 11, connected to the flexible duct 3; and a threaded portion 12, opposite to the tubular portion 11 with respect to the central body 10. In particular, the central body 10 comprises a hexagonal portion 10a and a circular portion 10b (FIG. 2).

The rigid duct 2 further comprises: an ogive 13, which is rigidly connected to the end portion 5 and mates with a flared portion 14 of the through hole 9 carried by the threaded portion 12; and a ring nut 15, having an annular abutment 16, which faces the side wall 5 and connects up to the threaded portion 12 itself to pack tighten axially the ogive 13 against the flared portion 14.

On the opposite side of the threaded portion 12, the tubular portion 11 is mounted by interference fit inside the end portion 8 of the side wall 6 of the flexible duct 3 and further comprises a conical tapered portion 17 for filleting with the central body 10 and a multiplicity of annular radial projections 18 located at equal distances apart from one another.

The flexible duct 3 further comprises a tightening bell 19, which tightens with radial interference and which is made of metal material and is located on the outside of the end portion 8. The bell 19 has a multiplicity of annular grooves 20, which are located at equal distances apart and are designed to deform the side wall 6 and an annular end wall 21, which co-operates axially with the tapered portion 17. The bell 19 and the side wall 6 can moreover be protected by a heat-shrinkable sheath 22, which is impermeable to the working fluid and is located radially external in order to guarantee fluid tightness.

A detailed embodiment of the fitting between the bell 19 and the tubular portion 11 suited to ensuring tightness at high pressures is described in the patent application No. EP1300622, filed in the name of the present applicant.

The assembly 1 further comprises, located transversely and externally with respect to the rigid duct 2 and the flexible duct 3, a blind silencer duct 23, and the circular portion 10b of the connection element 4 has a radial hole 24 branching off from the through hole 9, said radial hole 24 being fluidically connected to the silencer duct 23.

The silencer duct 23 comprises: an expandable multilayer tubular wall 25, comprising a layer made of elastomeric material and defining a propagation volume 26; a connection assembly 27 connected by welding to the radial hole 24; and a closing assembly 28 located axially opposite to the connection assembly 27 and axially delimiting the propagation volume 26.

The connection assembly 27 comprises a tubular insert 29, which has three radial annular projections 30 and is inserted on one side into the radial hole 24 and on the other into the propagation volume 26 so that an annular projection 30 is axially external with respect to the tubular wall 25. The connection assembly 27 further comprises a bell 31 similar to the bell 19, which is designed to tighten with radial interference the tubular wall 25 on the tubular insert 29 and which has an end wall 32 axially closed and pack tightened between the side wall 25 and a conical surface of the external annular projection 30.

On the opposite side of the connection assembly 27, the closing assembly 28 comprises an insert 33, which is full and, from the other points of view, is similar to the tubular insert 29, and a bell 34, which is similar to the bell 31.

Operation of the pipe/silencer device assembly 1 is described in what follows.

Working fluid at high pressure flows through rigid duct 2 and flexible duct 3, whilst the silencer duct 23 is located so that it branches off therefrom, and the expansion volume 26 is filled by a fluid substantially at rest.

The pressure waves caused by the fluid-dynamic and mechanical vibrations reach the radial hole 24 and propagate within the propagation volume 26.

In particular, the length and rigidity of the tubular wall 25 are sized according to known modalities so that the pressure waves at outlet from the propagation volume 26 are in phase opposition with respect to the pressure waves coming from the deformable duct 3 so as to obtain a destructive interference and to attenuate or eliminate the cause of noisy emissions.

During installation or maintenance, the ring nut 15 can be unscrewed from the connection element 4, which is obtained by turning from a hexagonal steel bar, by gripping using a tool on the hexagonal portion 10a and enabling removal of the pipe/silencer device assembly 1 from the rigid duct 2, generally located in a position that is difficult to access.

The advantages of the present pipe/silencer device assembly are described in what follows.

The use of the silencer duct 23 connected, so that it branches off therefrom, on the connection element 4 enables a simple and inexpensive connection to be obtained, which ensures tightness at high pressures.

Furthermore, the fact that the silencer duct 23 is connected so that it branches off enables limitation in head losses and containment of the temperature of the oil.

The silencer duct 23 is simple to produce and entails processes of fabrication altogether similar to those required for the flexible duct 3, thus enabling containment of the costs of the assembly 1 and guaranteeing the same reliability.

The bells 19, 31, 34, the ring nut 15, and the welding of the tubular insert 29 on the connection element 4 guarantee fluid-tight connections at high pressures.

The central body 10 enables a convenient removal of the ring nut 15 and a convenient replacement of the assembly 1 independently of the rigid duct 2, which can be located in areas that are difficult to access inside the engine compartment.

Finally, it is clear that the pipe/silencer device assembly described and illustrated herein may undergo modifications and variations, without thereby departing from the scope of protection of the present invention, as defined in the annexed claims.

For example, the tubular insert 29 can be connected to the connection element 4 via a removable connection, for example with a ring nut.

The radial hole 24 can present a diameter smaller than that of the through hole 9, so providing further damping of the pressure waves.

The invention claimed is:

1. A hydraulic power steering pipe comprising a first duct, a pipe/silencer device assembly including a connection element having a through hole with an axis (A) and comprising a first connection at one end thereof co-operating with said first duct, and a second duct fluidically connected at an opposite end of said connection element, wherein said connection element has a branching off hole provided therein that is fluidically connected to said through hole, and a blind silencer duct fluidically connected to said branching off hole, wherein said second duct further comprises a multilayer expandable cylindrical wall including a layer made from an elastomeric material and said blind silencer duct further comprises an expandable multilayer tubular wall including a layer made from an elastomeric material.

2. The pipe according to claim 1, wherein the silencer duct comprises on ends axially opposite to one another a closing assembly and a connection assembly connected to said branching off hole.

3. The pipe according to claim 2, wherein the connection assembly is connected in a permanent way to said connection element.

4. The pipe according to claim 2, wherein the connection assembly comprises a tubular insert, which is partially housed in an axial direction inside said branching off hole, and a first bell, which encloses with radial interference fit at least a portion of said tubular insert.

5. The pipe according to claim 2, wherein the closing assembly comprises: a full insert housed axially in said tubular wall; and a second bell, which secures with radial interference fit said full insert.

6. The pipe according to claim 1, wherein the connection element has built into it a prismatic body traversed by said through hole.

7. The pipe according to claim 1, wherein the second duct is flexible and said first duct is rigid.

8. The a pipe according to claim 7, wherein the first duct further includes a second removable connection to said connection element, and said second duct further includes a third permanent connection to said connection element.

9. The pipe according to claim 8, wherein the first connection includes a threaded portion and an inwardly flared portion and the second removable connection comprises a ring nut, axially co-operating with said threaded portion, and a curved head which mates with the corresponding flared portion.

10. The pipe according to claim 8, wherein the third connection comprises a bell housing providing an interference fit about an end portion of said second duct fitted on a tubular portion of said connection element.

11. A steering system of a vehicle, comprising a pipe/silencer device assembly according to claim 1.

12. The pipe according to claim 1 wherein the tubular wall has sufficient length and rigidity to establish pressure waves at an outlet thereof that are in phase opposition with respect to pressure waves within the first an second ducts to thereby provide a destructive interference therewith.

13. A pipe/silencer device assembly for use in a hydraulic power steering pipe comprising a main fluid line including first and second ducts fluidically joined together by a connection element having a through axis (A) and including a first connection at one end thereof co-operating with the first duct and a second connection at an opposite end thereof cooperating with the second duct, wherein said connection element has a branching off hole fluidically connected to said through hole, and a blind silencer duct operatively and fluidically connected at one end to said branching off hole, wherein said blind silencer duct further comprises a multilayer tubular structure closed at an end opposite to the connected said one end, the tubular structure including a layer made from an elastomeric material and having sufficient length and rigidity to establish pressure waves at an outlet thereof that are in phase opposition with respect to pressure waves within the main fluid line to thereby provide a destructive interference therewith.

* * * * *